United States Patent
Bailey

(10) Patent No.: US 10,207,862 B1
(45) Date of Patent: Feb. 19, 2019

(54) FLOWABLE MATERIAL CONTAINER WITH AN OPENING HAVING IMPROVED FLOW CHARACTERISTICS

(71) Applicant: Buckhorn, Inc., Milford, OH (US)

(72) Inventor: Scott Bailey, Cincinnati, OH (US)

(73) Assignee: Buckhorn, Inc., Milford, OH (US)

( * ) Notice: Subject to any disclaimer, the term of this patent is extended or adjusted under 35 U.S.C. 154(b) by 0 days.

(21) Appl. No.: 15/859,371

(22) Filed: Dec. 30, 2017

(51) Int. Cl.
*B65D 88/54* (2006.01)
*B65D 88/52* (2006.01)

(52) U.S. Cl.
CPC .............. *B65D 88/54* (2013.01); *B65D 88/52* (2013.01)

(58) Field of Classification Search
CPC ................................ B65D 88/54; B65D 88/52
USPC .... 222/561, 625, 185, 460, 462, 572; 220/6, 220/4.28–4.32
See application file for complete search history.

(56) References Cited

U.S. PATENT DOCUMENTS

| 779,128 | A |  | 1/1905 | Mummey |
| 2,515,137 | A |  | 7/1950 | Schall |
| 2,675,947 | A |  | 4/1954 | Wynn |
| 2,745,573 | A |  | 5/1956 | Fuller |
| 3,083,879 | A |  | 4/1963 | Coleman |
| 4,278,190 | A |  | 7/1981 | Oory |
| 4,280,640 | A |  | 7/1981 | Daloisio |
| 5,491,542 | A |  | 2/1996 | Nagashima |
| 5,845,799 | A |  | 12/1998 | Deaton |
| 6,010,022 | A | * | 1/2000 | Deaton ................. B65D 19/18 220/4.03 |
| 8,425,150 | B1 | * | 4/2013 | Happel ..................... E02B 7/28 251/326 |
| 9,580,237 | B2 | * | 2/2017 | Nolan .................... B65D 88/30 |
| 2015/0321837 | A1 |  | 11/2015 | Miller |

* cited by examiner

*Primary Examiner* — Lien Ngo

(57) ABSTRACT

The outlet of a flowable material container has a flow cutoff device, which is slidably supported in a frame assembly that comprises two, spaced apart perforated side rails and a perforated end rail. No accumulation shield is used.

19 Claims, 5 Drawing Sheets

FLOWABLE MATERIAL CONTAINER WITH AN OPENING HAVING IMPROVED FLOW CHARACTERISTICS

BACKGROUND

Bulk boxes and containers having collapsible side and end walls are frequently used for holding and dispensing flowable materials such as agricultural products including seeds for planting. Such containers have interior walls that are angled or inclined and which direct flowable material to a dispensing outlet. After delivery and dispensing of flowable material, the sides of the container can be collapsed, reducing the container's "size" and facilitating the container's return and re-use. Such a container can thus be used over and over rather than once and then discarded.

The dispensing outlets of bulk dispensing containers are known to have areas adjacent the dispensing outlet, which are susceptible to collecting residual amounts of flowable material and which may retain residual amounts of a flowable material that was stored and dispensed in a previous use of the container. Any such residual material poses a contamination threat when a container is reused to ship different flowable materials. A bulk box or container for shipping and dispensing a flowable material but which reduces or eliminates flowable material capture and retention by and around the dispensing opening would be an improvement over the prior art.

DETAILED DESCRIPTION

U.S. pre-grant publication 2015/0321837, having application Ser. No. 14/704,253 and which is entitled "Container Having Dispensing Outlet Preventing Collection of Residual Material" by Miller, is incorporated herein by reference in its entirety. That reference is referred to interchangeably hereinafter as both the "Miller apparatus" and "Miller."

In the Miller reference, a shield plate can cause granular material to be trapped between the cut-off device and the shield plate. Moreover, the shield plate of Miller, is also known to add material cost and manufacturing cost. Eliminating the Miller apparatus shield plate and changing the frame assembly side rails can reduce and even prevent the collection of residual flowable material and reduce the manufacturing cost of a flowable material container.

Figure 1:
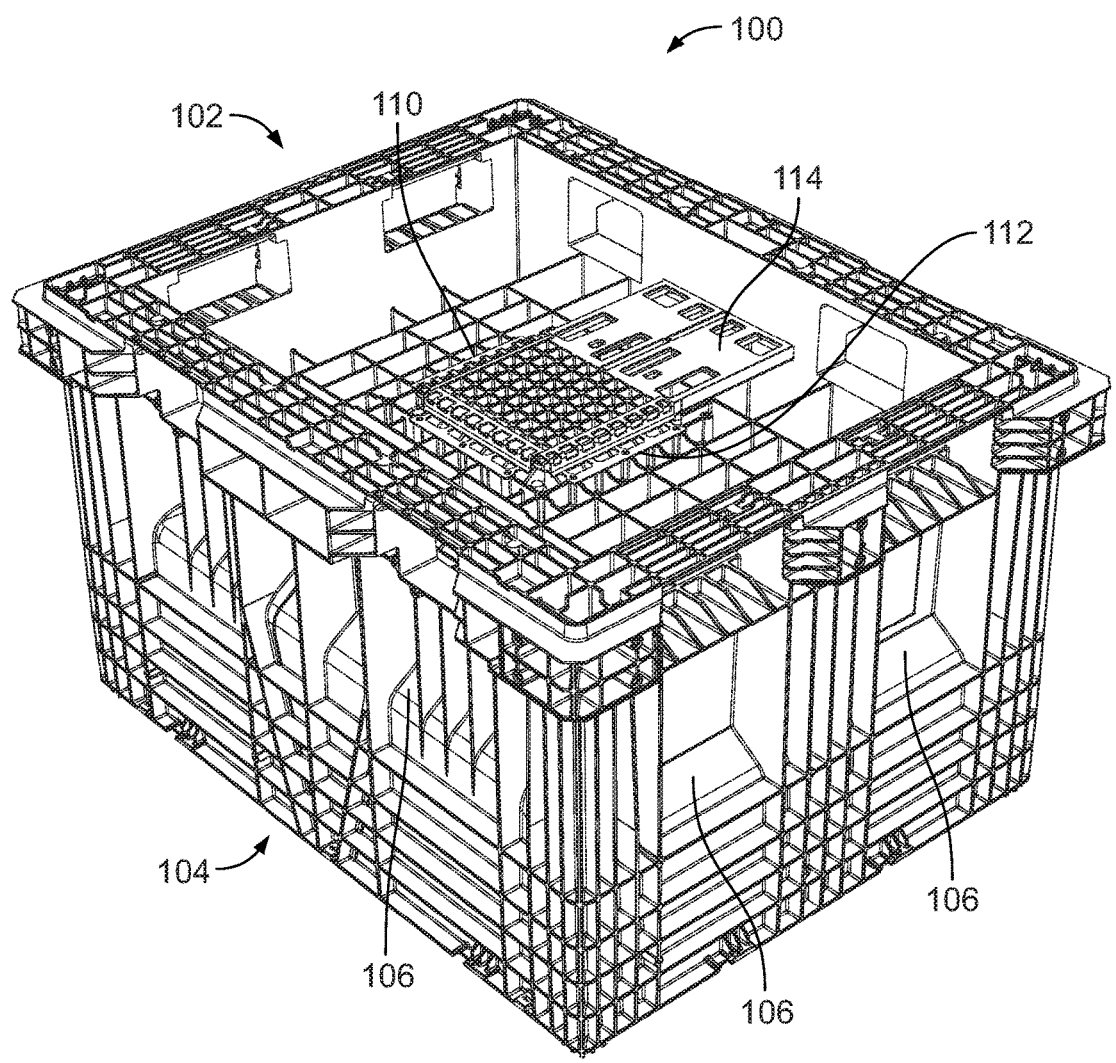
FIG. 1 is a perspective view of the bottom of a flowable material container with an opening flow control device that has improved flow characteristics.

Referring now to FIG. 1 as well as the Miller apparatus, a prior art flowable material container 100 is shown inverted or "upside down." The container 100 has an open top 104 (not visible) and a bottom 102. Angled side walls 106 slope downwardly and inwardly toward an outlet opening 110 from which flowable material can be dispensed by opening and closing a flow cut-off device 114, which is supported in a frame assembly 112, best seen in FIGS. 2-5.

Figure 2:
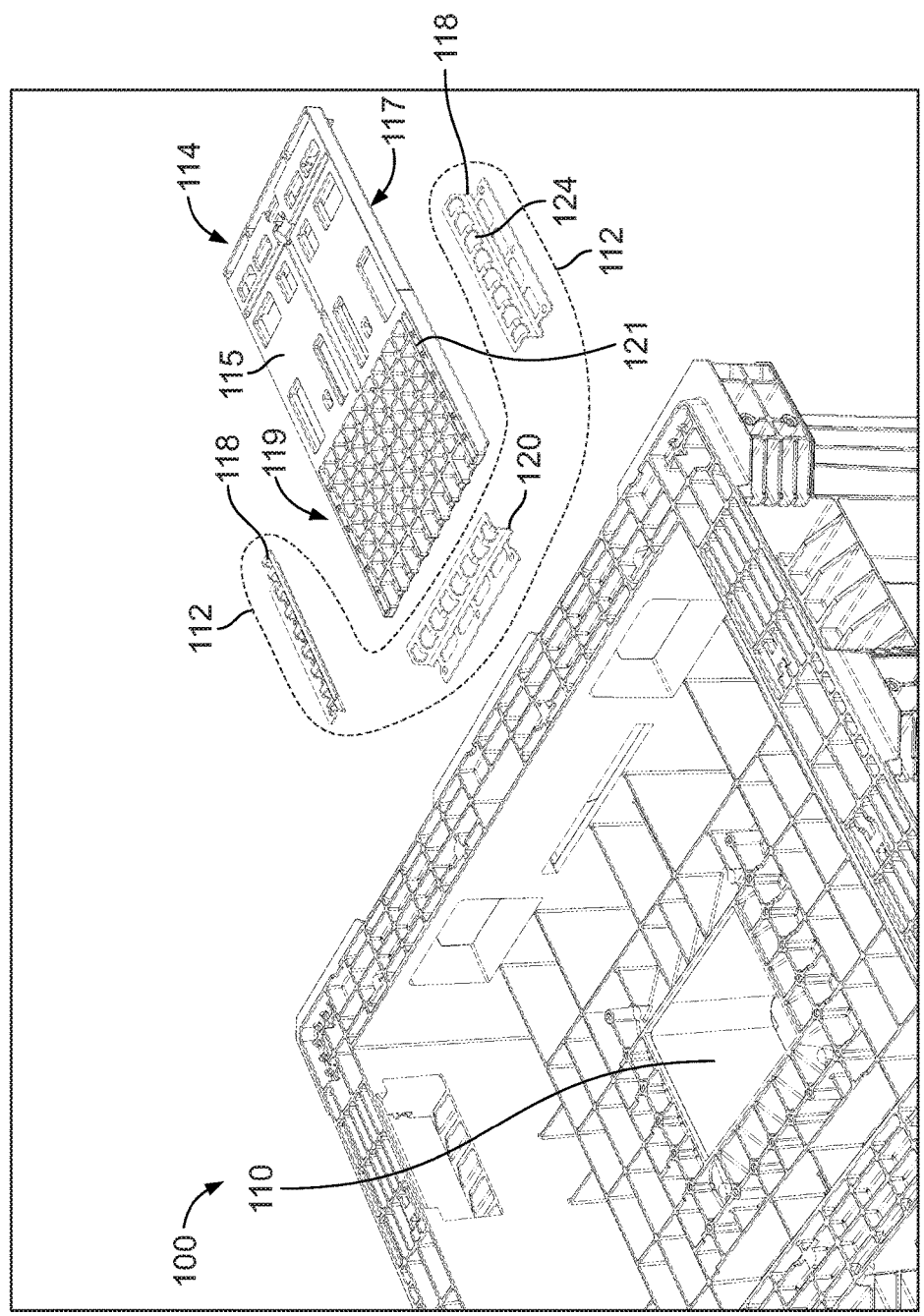
FIG. 2 is an exploded view of the bottom of the flowable material container shown in FIG. 1, showing an improved flow control device comprising a frame assembly that is made up of "perforated" side rails and a similarly perforated end rail, the perforations preventing flowable material from becoming entrapped.

FIGS. 2-6 show the preferred embodiment of an improved frame assembly 112, albeit removed from the outlet opening 110 of the material container 100 and "exploded" to better show components of the frame assembly 112, which comprises side rails 118 and an end rail 120. A substantially planar flow cut-off device 114 has a top 115 and an opposing bottom 117. The flow cut-off device 114 also has a "left" portion 119, which comprises spaced-apart reinforcing ribs 121. As can be seen in FIG. 1, the flow cut-off device 114 is supported against the outlet opening 110 of the container 100 by the frame assembly 112. As best seen in FIG. 2, the flow cut-off device 114 is sized, shaped and arranged vis-à-vis the frame assembly 112 to be able to slide over and away from the outlet opening 110. The flow cut-off device 114 is thus "slidably supported" against the outlet opening 110 by the frame assembly 112. Together, the frame assembly 112 and flow cut-off device 114 are considered to be a flow control device for the outlet opening of a flowable material or a flowable material control device for an outlet opening of a bulk material container, such as the bulk container 100 shown in FIG. 1.

Figure 3:
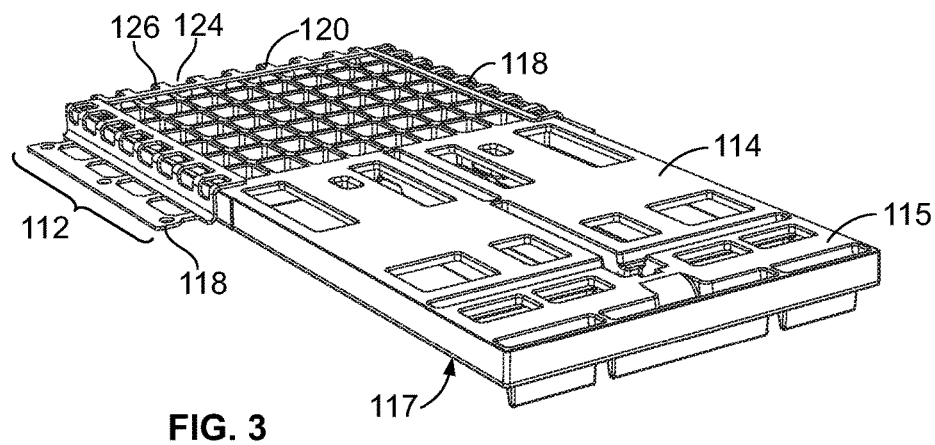
FIG. 3 is an isolated and perspective view of the improved flow control device in its closed or flow blocking position.
Figure 4:
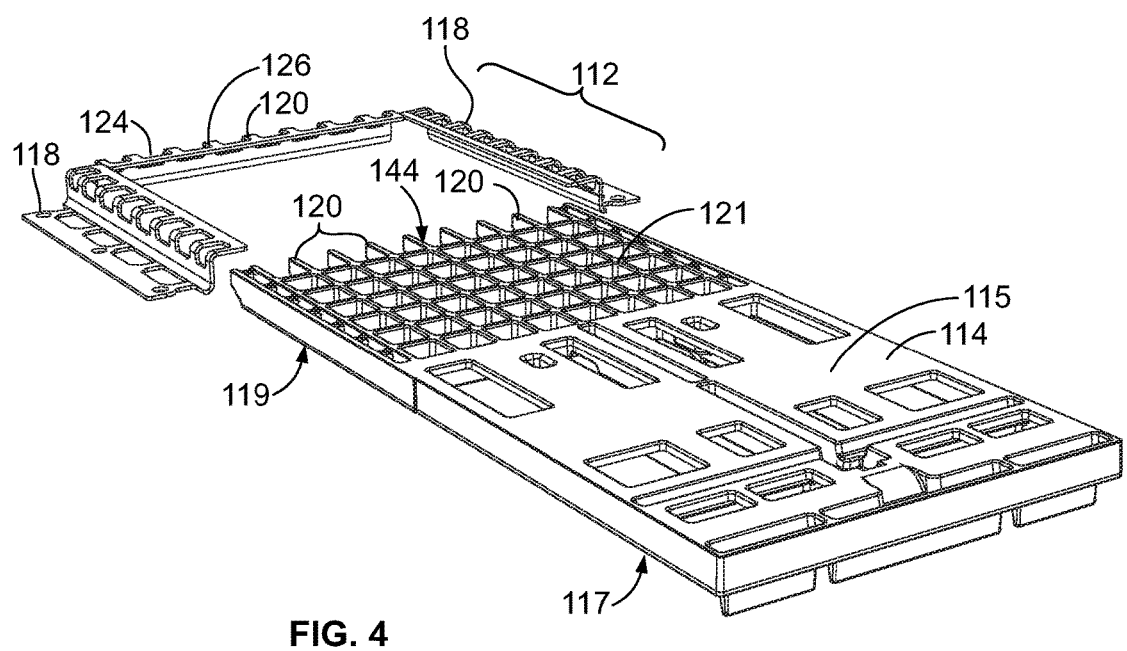
FIG. 4 is an isolated and perspective view of the improved flow control device in its open or flow enabling position.

FIG. 3 depicts the flow cut-off device 114 in a closed or "flow blocking" position in the frame assembly 112. FIG. 4 depicts the flow cut-off device 114 in its open or "flow-enabling" position in the frame assembly 112.

Figure 5:
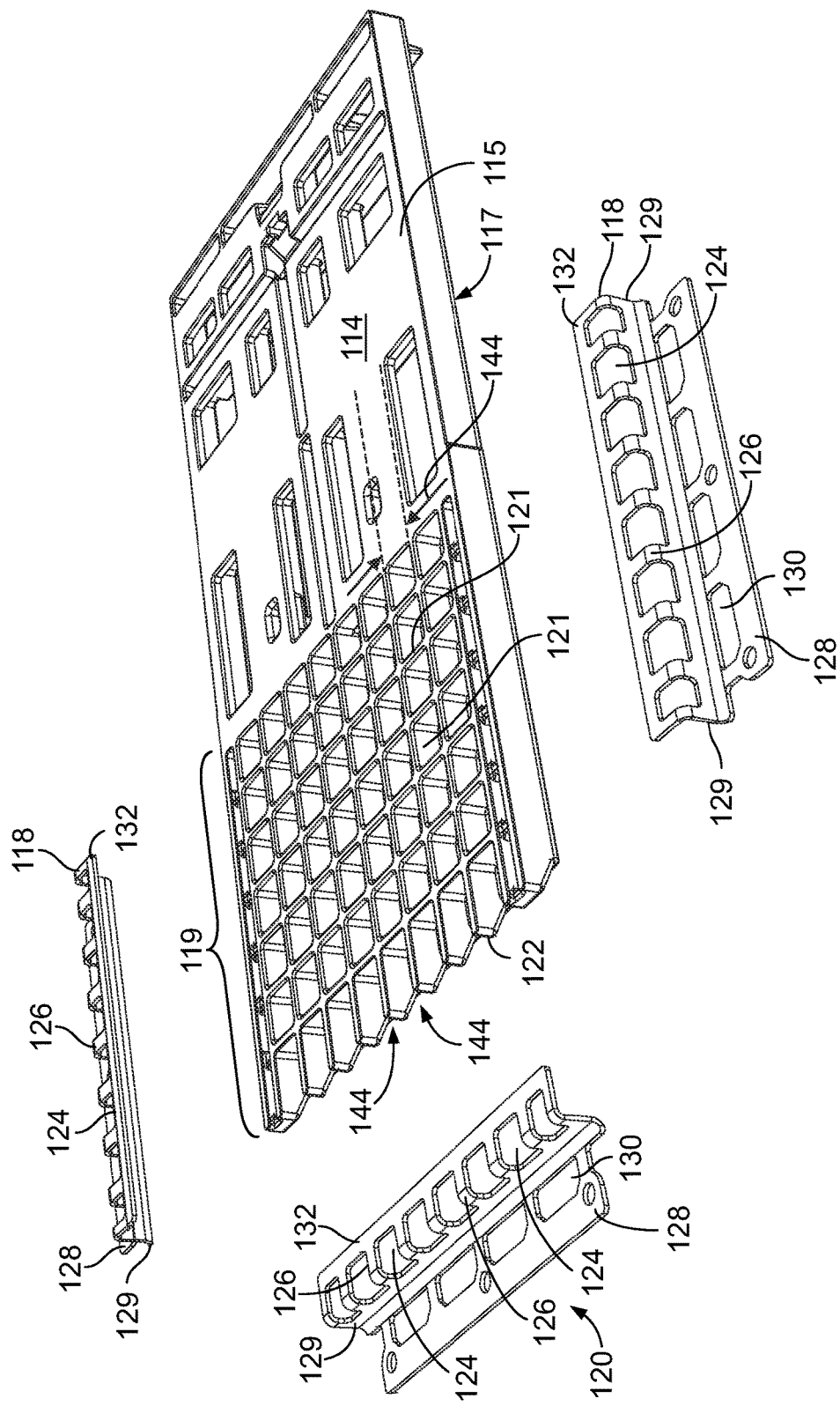
FIG. 5 is an isolated and exploded view of the perforated frame assembly and flow cutoff device and showing the reinforcing rib ends with a negative bevel.
Figure 6:
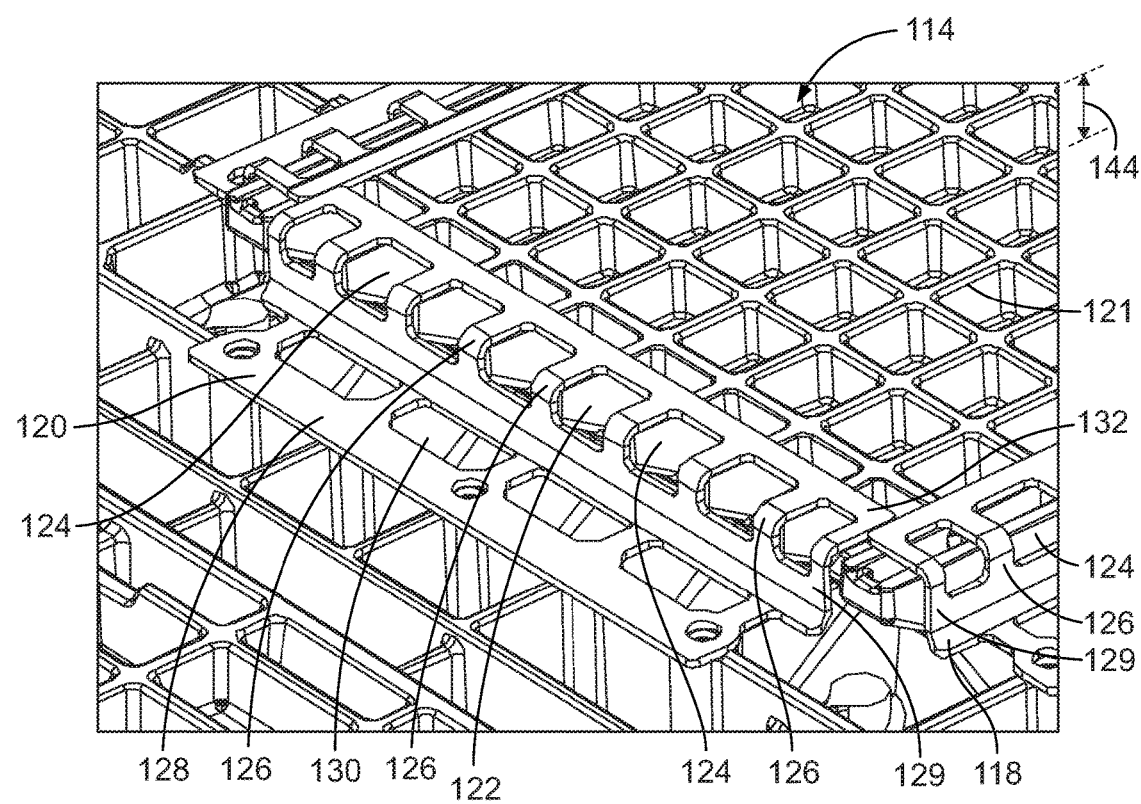
FIG. 6 is an isolated perspective view showing engagement of the negative bevel reinforcing rib ends with ribs of the end rail.

Referring now to FIG. 5, the "left" ends of laterally extending reinforcing ribs 121 of the flow cut-off device 114 have reinforcing rib ends 122 with a "negative" bevel. Those negative-beveled reinforcing rib ends 122 extend toward the end rail 120 portion of the frame assembly 112. As best seen in FIG. 6, the reinforcing rib ends 122 align with and will abut vertically oriented end rail ribs 126, which define the holes or perforations 124 in the end rail 120.

Unlike the Miller apparatus, the flowable material container 100 depicted in the figures omits or lacks a flowable material accumulation shield. And, unlike the Miller apparatus, in the preferred embodiment shown in the figures, both side rails 118 and the end rail 120 are perforated with holes 124 in the "top" surfaces of the side rails 118 and end rail 120. The side rails 118 and end rail 120 also have holes 130 formed in a "mounting foot" of each rail 118 and 120. The mounting foot 128 of each rail 118 and 120, is sized and shaped to provide a flange-like and substantially planar surface that can be screwed or otherwise fastened to reinforcing ribs in the bottom 102 of the container 100. Attaching the mounting foot 128 of the rails 118, 120 to any kind of structure surrounding the outlet opening 110 thus "couples" the rails 118, 120 and their mounting feet to the outlet opening 110. The holes 124 and 130 allow granular material that would otherwise be trapped between the end rail, side rails and the flow cut-off device of Miller, to fall away from the outlet opening preventing them from being entrapped and thus interfering with the operation of the flow cut-off device in the frame assembly 112. Stated another way, eliminating the flowable material accumulation shield of Miller and perforating the side rails and end rail and a "mounting foot" 128 of those rails eliminates a structure required by the Miller apparatus but which improves the operation and reliability of a flowable material container having the improved frame assembly 112.

Still referring to FIG. 5, the side rails 118 and the end rail 120 are essentially elongated metal plates bent or stamped to have a shape reminiscent of the letter "Z." For claim construction purposes, the cross sectional shape of the rails 118 and 120 is considered herein to be reminiscent of or similar to and thus "substantially the same" as the Arabic letter "Z."

Each rail 118, 120 has a substantially planar mounting foot 128, which is provided with apertures 130, substantially rectangular, and which prevent granular material from collecting "above" the side rails 118 and the end rail 120 when they are attached to the bottom of a flowable material container 100.

Each rail 118 and 120 has a vertical portion 129 and a substantially planar, elevated or "top" portion 132, which are provided with their own apertures or perforations 124. The perforations 124 are separated from each other and defined by rail ribs 126 that extend between the planar top surface 132 and the intermediate vertical portion 129. In the preferred embodiment, the perforations 124 are substantially rectangular although other shapes could be used with alternate embodiments.

As best seen in FIG. 6, when the flow cut-off device 114 is located within the frame assembly 112, the reinforcing rib ends 122 of the flow cut-off device are aligned with and can abut (make contact with) the rail ribs 126 of the end rail 120. Perforations 124 in the end rail 120 are also aligned with and have widths that are substantially equal to the width of an inter-reinforcing rib end separation space 144. That separation space 144 is considered herein to be the space between each reinforcing rib end 122 of the flow cut-off device 114 and enables flowable material to fall away from the frame assembly 112 and flow cut-off device 114 rather than being trapped by a prior art flowable material accumulation shield of the Miller apparatus. The holes 130 in the mounting foot 128 of each rail 118, 120 also enables flowable material to fall away from the frame assembly 112 rather than being trapped by an "accumulation shield" such as the one described in Miller.

In the preferred embodiment, the inter-reinforcing rib end separation space 144 between each reinforcing rib end 122 is preferably the same. Varying that inter-reinforcing rib end separation space, however, preferably includes a corresponding change in the width of perforation 124 in the end rail 120 such that flowable material will not be trapped by or between the end rail 120 and the flow cut-off device 114.

In the preferred embodiment, the inter-reinforcing rib end separation space 144 and the corresponding areas of the perforations 124 and 130 in the side rails 118 and the end rail 120 are preferably selected to allow a pre-determined type of flowable material to be kept in the attached flowable material container 100 to flow through the rib end separation space and perforations 124, 130 in the end rail 120 as well as the perforations 124, 130 in the side rails 118. By way of example, the minimum width of the inter-reinforcing rib end separation space 144 and the corresponding perforation 124 in the end rail 120 for corn will typically be different than the minimum spacing for soybeans or rice. The perforations 130 in the mounting feet are preferably determined the same way.

In the preferred embodiment, the dimensions of the side rails 118 and the end rail 120 are the same, as shown in the figures, making the side rails 118 and end rail 120 interchangeable with each other. In an alternate embodiment, the side rail 118 dimensions are the same but the end rail 120 dimension is different from the similarly-dimensioned side rails 118. In yet another embodiment, the two side rails 118 have dimensions that are different from each other, and with one or both dimensions of those side rails 118 being different from the end rail 120 dimensions.

In one alternate embodiment, the top surfaces of the side rails are not perforated. The mounting feet, however, are perforated.

In one embodiment, the frame assembly 112 shown in the figures and described above and the flow cut-off device shown in the figures and described above are used with a container 100, the walls of which can be collapsible.

The foregoing description is for purposes of illustration only. The true scope of the invention is set forth in the following claims.

What is claimed is:

1. A flowable material control device for an outlet opening of a flowable material container, the flowable material control device comprising:
   a frame assembly configured to be coupled to the outlet opening and comprising first and second side rails and an end rail, the side rails and the end rail each having a top surface and a mounting foot, each top surface and each mounting foot of each rail being coupled to and separated from each other by a corresponding intermediate portion, each mounting foot being configured to be coupled to the flowable material container;
   wherein, the top surfaces of the rails are substantially planar and wherein the mounting feet have fastener holes and a granular material passage hole, each of the fastener holes being configured to receive a fastener to attach the frame assembly to the flowable material container, the granular material passage hole being configured to allow granular material to pass through it when the frame assembly is attached to the flowable material container, the fastener holes being additionally configured such that they are unable to pass granular material when the frame assembly is attached to the flowable material container, and wherein the side rails are substantially parallel to each other; and
   wherein the end rail is substantially orthogonal to both side rails; and
   a flow cutoff device slidably supported in the frame assembly by the side rails, during movement of the flow cutoff device between a closed, granular material flow blocking position and an open, granular material flow enabling position;
   wherein the flow cutoff device comprises a plurality of reinforcing ribs having reinforcing rib ends, the reinforcing rib ends extending toward the end rail.

2. The flowable material control device of claim 1, wherein at least one of the top surfaces of the side rails and the end rail have at least one granular material passage hole.

3. The flowable material control device of claim 1, wherein the flowable material control device lacks a flowable material accumulation shield.

4. A flowable material container having angled walls, and an outlet opening, the outlet opening being defined by the angled walls, the flowable material container comprising:
   a frame assembly coupled to the outlet opening and comprising first and second spaced apart side rails and an end rail, each of the side rails and the end rail having a top surface and a corresponding mounting foot, the mounting foot of each rail being coupled to the outlet opening, the mounting feet of the side rails and end rail being substantially co-planar;

wherein, the top surface of the first and second spaced apart side rails are substantially parallel and wherein the mounting foot of the first and second side rails and the mounting foot of the end rail having first and second mounting holes and at least one granular material passage hole that is configured to allow granular material to flow through it when the frame assembly is attached to the flowable material container, each mounting hole being sized, shaped and arranged to receive a fastener that attaches the frame assembly to the flowable material container, the mounting holes being configured to be unable to pass granular material when the frame assembly is attached to said flowable material container by a fastener; and wherein the end rail is substantially orthogonal to both side rails; and a flow cutoff device slidably supported in the frame assembly by the spaced-apart side rails, the flow cutoff device being supported by the spaced-apart side rails during movement of the flow cutoff device between a closed, flow blocking position and an open, flow enabling position;

wherein the flow cutoff device comprises a plurality of reinforcing ribs having reinforcing rib ends, the reinforcing rib ends extending toward the end rail.

5. The flowable material container of claim 4, wherein at least one of the top surfaces of the side rails and the top surface of the end rail is perforated.

6. The flowable material container of claim 4, wherein the flowable material container lacks an accumulation shield and wherein the first and second side rails and the end rail have a cross sectional shape substantially the same as the Arabic letter "Z."

7. The flowable material container of claim 6, wherein dimensions of the first and second side rails are substantially the same and wherein the end rail dimensions are different from the side rails' dimensions.

8. The flowable material container of claim 6, wherein the first and second side rails have different dimensions.

9. The flowable material container of claim 6, wherein the end rail and side rails comprise a plurality of granular material passage holes, which are separated from each other and defined by rail ribs.

10. The flowable material container of claim 9, wherein the plurality of openings are substantially rectangular.

11. The flowable material container of claim 10, wherein the reinforcing rib ends of the flow cutoff device are aligned with substantially vertical-oriented rail ribs of the end rail.

12. The flowable material container of claim 11, wherein the reinforcing rib ends of the flow cutoff device are separated from each other by an inter-reinforcing rib end separation space, which is located between each reinforcing rib end of the flow cutoff device.

13. The flowable material container of claim 12, wherein the inter-reinforcing rib end separation space between each reinforcing rib end is substantially the same.

14. The flowable material container of claim 13, wherein the reinforcing rib ends of the flow cutoff device abut the substantially vertical rail ribs in the end rail, when the flow cutoff device is in the flow blocking position.

15. The flowable material container of claim 13, wherein a plurality of the reinforcing rib ends of the flow cutoff device have a negative bevel.

16. The flowable material container of claim 14, wherein the inter-reinforcing rib end separation space between each reinforcing rib end of the flow cutoff device is aligned with a corresponding opening in the end rail, wherein the inter-reinforcing rib end separation space has a width, said width being selected to allow a predetermined type of flowable material to be kept in the flowable material container, to flow through the inter-reinforcing rib end separation space and flow through the perforations in the end rail.

17. The flowable material container of claim 14, wherein walls of the container are collapsible.

18. The flowable material control device of claim 1, wherein the top surfaces of the side rails and the top surface of the end rail is perforated with a granular material passage hole.

19. The flowable material container of claim 4, wherein the top surfaces of the side rails and the top surface of the end rail is perforated with a granular material passage hole.

* * * * *